United States Patent
Gassner

(10) Patent No.: US 10,323,741 B2
(45) Date of Patent: Jun. 18, 2019

(54) SLIDER FOR A DRIVE

(71) Applicant: LIMOSS (SHENZHEN) CO., LTD, Shenzhen (CN)

(72) Inventor: Christian Gassner, Shenzhen (CN)

(73) Assignee: LIMOSS (SHENZHEN) CO., LTD, Shenzhen (CN)

( * ) Notice: Subject to any disclaimer, the term of this patent is extended or adjusted under 35 U.S.C. 154(b) by 145 days.

(21) Appl. No.: 14/861,166

(22) Filed: Sep. 22, 2015

(65) Prior Publication Data
US 2016/0327147 A1 Nov. 10, 2016

(30) Foreign Application Priority Data
May 6, 2015 (CN) .................. 2015 2 02867251 U

(51) Int. Cl.
*F16H 57/025* (2012.01)
*F16H 25/24* (2006.01)
(Continued)

(52) U.S. Cl.
CPC ........... *F16H 57/025* (2013.01); *F16H 25/24* (2013.01); *B60N 2/067* (2013.01); *F16H 2025/2037* (2013.01)

(58) Field of Classification Search
CPC .................. F16H 57/025; F16H 57/039; F16H 2025/2031; F16H 2025/2037; F16H 2025/204; F16H 25/20; F16H 25/2025; F16H 25/2409; F16H 25/24; F16H 2025/2445; F16H 2025/2081; F16H 2025/2084; B60N 2/067; B60N 2/0232; B60N 2/164; B60N 2/1853; B60N 2002/0236; A47C 7/462; A47C 7/402; B66F 3/18; B66F 3/44; B66F 1/06;
(Continued)

(56) References Cited

U.S. PATENT DOCUMENTS 801,409 A * 10/1905 Smith .................... F16L 3/1025
248/60
924,743 A * 6/1909 Cox et al. ................ B23Q 5/32
173/39
(Continued)

FOREIGN PATENT DOCUMENTS

AU 585155 B2 * 6/1989 ................ F16B 2/14
DE 2310170 A1 * 9/1974 ................ F16L 3/10
(Continued)

*Primary Examiner* — Daniel D Yabut
(74) *Attorney, Agent, or Firm* — Anova Law Group, PLLC

(57) ABSTRACT

Provided is a slider having a driving plate and driving plate head cover for connecting a driving unit to a steel pipe. The diving plate and its head cover connect around the circumference of a steel pipe by way of one or more screws passing through one or more threaded pathways in the driving plate, through corresponding threaded pathways in its cover, and through corresponding holes in the steel pipe; a further threaded pathway in the driving plate connects to the driving unit. In embodiments, the driving plate is configured with sliding channels which engage with the protrusions of the driving plate head cover. In certain embodiments, the driving unit may be connected in perpendicular orientation to the one or more screws, and one or more pathways, that connect the driving plate and its cover to the steel pipe.

4 Claims, 6 Drawing Sheets

(51) Int. Cl.
*B60N 2/06* (2006.01)
*F16H 25/20* (2006.01)

(58) Field of Classification Search
CPC .............. B66F 1/02; Y10T 74/18576; Y10T 74/18648; Y10T 74/18616; Y10T 74/18608; Y10T 74/18656; Y10T 74/1974; Y10T 74/19735; Y10T 74/19823; Y10T 74/1527; Y10T 74/173; Y10T 74/20504; F16L 3/126; F16L 3/123; F16L 3/1207
See application file for complete search history.

(56) References Cited

U.S. PATENT DOCUMENTS

| | | | | |
|---|---|---|---|---|
| 3,046,040 | A * | 7/1962 | Luper | F16B 7/18 285/188 |
| 3,101,006 | A * | 8/1963 | Kurt | E21B 19/24 173/160 |
| 3,145,013 | A * | 8/1964 | Grudoski | A63G 9/00 248/230.5 |
| 3,524,627 | A * | 8/1970 | Boyanton | E04H 17/1413 248/230.5 |
| 3,652,105 | A * | 3/1972 | Humlong | B62H 1/02 280/301 |
| D264,379 | S * | 5/1982 | Slinkard | D24/128 |
| 4,466,309 | A * | 8/1984 | Matey | A45B 9/02 16/421 |
| 6,334,733 | B1 * | 1/2002 | Tyson | F16B 7/182 403/306 |
| 6,517,157 | B1 * | 2/2003 | Vorac | B60N 2/0232 297/344.13 |
| 7,278,331 | B2 * | 10/2007 | Wagner | B60N 2/0232 74/89.23 |
| 2007/0172312 | A1 * | 7/2007 | Wang | F16B 7/18 403/388 |
| 2010/0044542 | A1 * | 2/2010 | Koga | B60N 2/067 248/429 |

FOREIGN PATENT DOCUMENTS

FR 1562272 A * 4/1969 ............... F16L 3/10
FR 2442366 A1 * 6/1980 ............ F16L 3/1008

* cited by examiner

US 10,323,741 B2

SLIDER FOR A DRIVE

CROSS-REFERENCES TO RELATED APPLICATIONS

This application claims the priority of Chinese patent application No. 201520286725.1, filed on May 6, 2015, the entire contents of all of which are incorporated herein by reference.

FIELD OF THE INVENTION

The present invention relates to the field of driving blocks technology area, and more particularly, to a slider for a drive.

BACKGROUND

A driving block (i.e., a slider) is often used as a connection unit for medical devices, sofa seats and else, which is a connection component applied to move the units to be driven together under a driving force. However, the existing technologies for driving blocks have some complexities in machining and assembling, and a higher production cost.

Therefore, the prior art needs to be improved and developed.

BRIEF SUMMARY OF THE DISCLOSURE

The technical problems to be solved in the present invention is, aiming at the defects of the prior art, providing a slider for a drive, in order to solve the problems in the prior art, that the machining and assembling for driving blocks is some kind of complicated, and their production cost is relatively high.

The technical solution of the present invention to solve the technical problems is as follows:

A slider for a drive, wherein, it comprises a driving plate applied to cover the driving unit and move under the driving forces from the driving unit, the driving plate also has a steel pipe fixed together, applied to move the units to be driven together.

The slider for the drive, wherein, it further comprises a driving plate head cover, applied to form a steel channel for a steel pipe to go through, after engaging with the driving plate; the driving plate also comprises a number of first inner threaded pathways, and screw holes are arranged at the according positions in the steel pipe, a number of second inner threaded pathways are arranged at the according positions in the driving plate head cover. Screws pass through the second inner threaded pathways, the screw holes and the first inner threaded pathways, before fixing the driving plate head cover and the steel pipe onto the driving plate.

The slider for the drive, wherein, at least one second inner threaded pathway is arranged in a driving plate head cover, the same number of screw holes as that of the second inner threaded pathways are arranged in the steel pipe, and the same number of first inner threaded pathways as that of the second inner threaded pathways are arranged in the driving plate.

The slider for the drive, wherein, it further comprises a driving plate head cover, applied to form a steel channel for a steel pipe to go through, after engaging with the driving plate; a number of first fixed pin pathways are arranged in the driving plate head cover, second fixed pin pathways are arranged at the according positions in the driving plate, and third fixed pin pathways are arranged at the according positions in the steel pipe; while the fixed pins pass through the first fixed pin pathways, the second fixed pin pathways and the third fixed pin pathways in sequence, then fix the driving plate head cover and the steel pipe onto the driving plate.

The slider for the drive, wherein, at least one first fixed pin pathways are arranged in the driving plate head cover, the same number of second fixed pin pathways as that of the first fixed pin pathways are arranged in the driving plate, and the same number of third fixed pin pathways as that of the first fixed pin pathways are arranged in the steel pipe.

The slider for the drive, wherein, it further comprises a driving plate head cover, applied to form a steel channel for a steel pipe to go through, after engaging with the driving plate; the steel pipe comprises an intermediate pipe, a first split tube fixedly arranged at one end of the intermediate tube and a second split tube fixedly arranged at the other end of the intermediate tube; both the driving plate and the driving plate head cover are fixed on the intermediate tube.

Benefits: the slider for the drive provided in the present invention, owes a simple machining and assembling process, a relatively lower production cost, and is able to meet the user's requirements.

DETAILED DESCRIPTION

The present invention provides a slider for a drive, In order to make the purpose, technical solution and the advantages of the present invention clearer and more explicit, further detailed descriptions of the present invention are stated here, referring to the attached drawings and some embodiments of the present invention. It should be understood that the detailed embodiments of the invention described here are used to explain the present invention only, instead of limiting the present invention.

Figure 1:
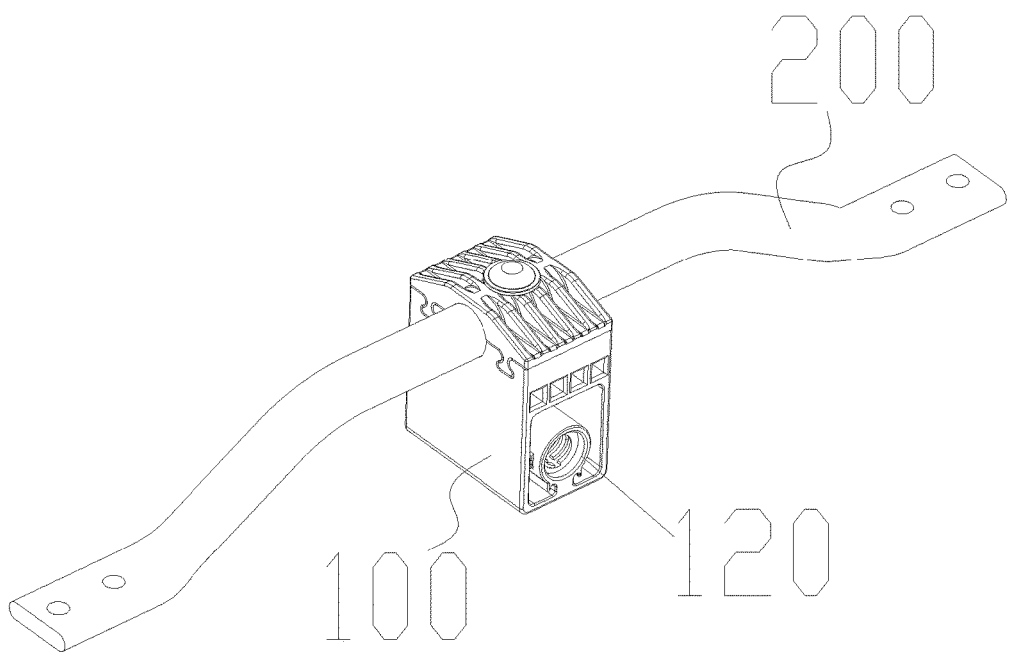
FIG. 1 illustrates a schematic diagram of an embodiment I on the slider for a drive as described in the present invention.
Figure 3:
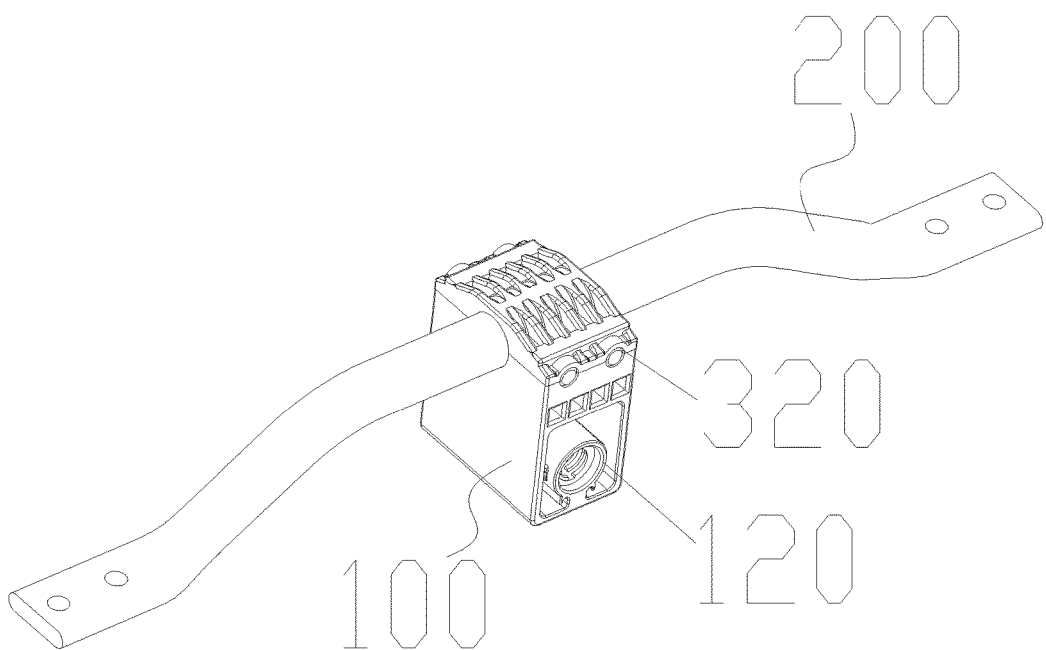
FIG. 3 illustrates a schematic diagram of an embodiment II on the slider for a drive as described in the present invention.
Figure 5:
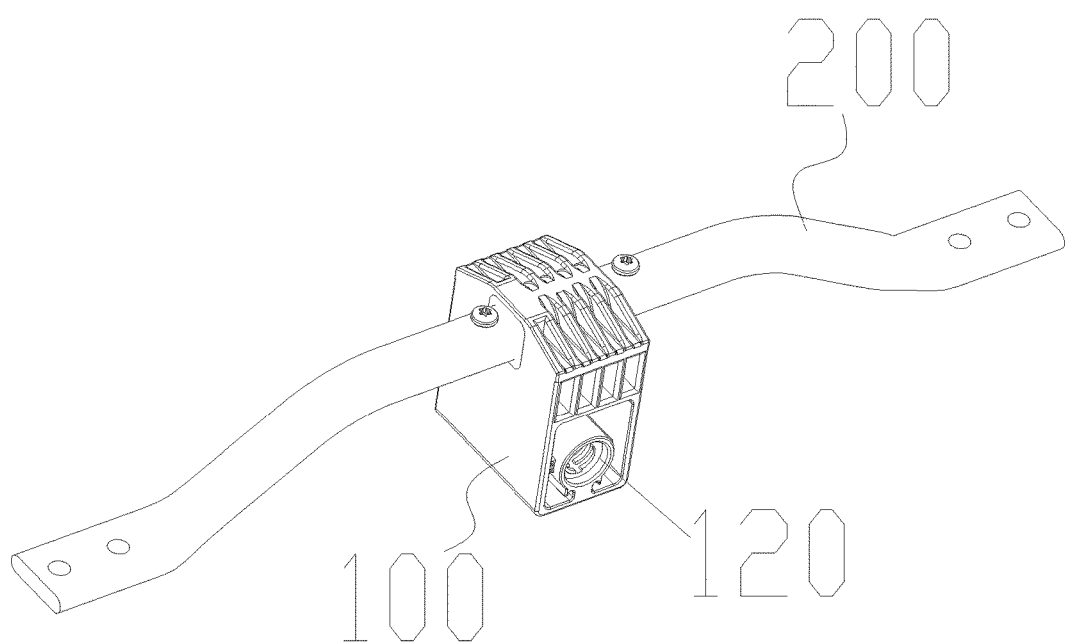
FIG. 5 illustrates a schematic diagram of an embodiment III on the slider for a drive as described in the present invention.

Referring to FIG. 1, FIG. 3 and FIG. 5 together, wherein, FIG. 1 illustrates a schematic diagram of the embodiment I on the slider for a drive as described in the present invention, FIG. 3 illustrates a schematic diagram of the embodiment II on the slider for a drive as described in the present invention, FIG. 5 illustrates a schematic diagram of the embodiment III on the slider for a drive as described in the present invention. The slider for a drive comprises a driving plate 100, applied to cover the driving unit and move under the driving forces from the driving unit, the driving plate 100 also has a steel pipe 200 fixed there and applied to move the units to be driven together.

The methods of the steel pipe 200 fixing to the driving plate 100 in the slider for a drive as described in the present invention include, but not limited to, the following three ways: first, they are fixed by screws; second, they are fixed by fixing pins; third, they are fixed by a method of splitting tubes. In order to illustrate the slider for a drive as described in the present invention more clearly, specific embodiments according to the three fixing methods are described below.

Embodiment I

Figure 2:
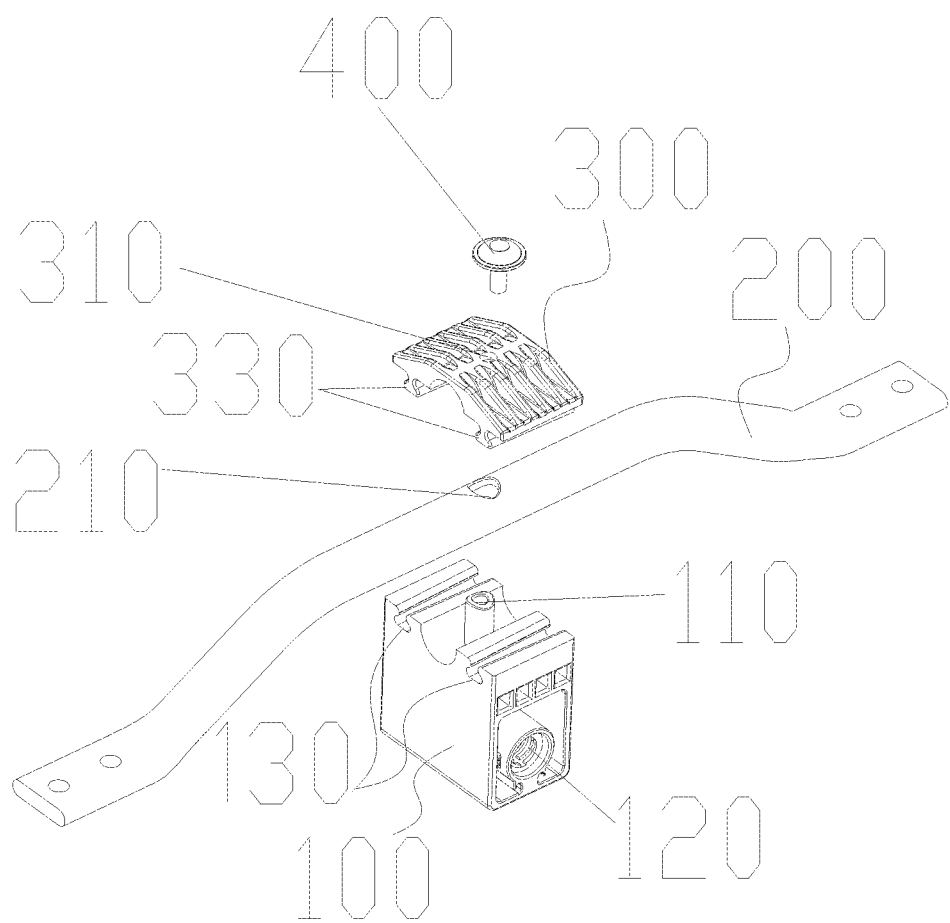
FIG. 2 illustrates an explored diagram of the embodiment I on the slider for a drive as shown in FIG. 1.

As shown in FIG. 1 and FIG. 2 together, the slider for a drive further includes a driving plate head cover 300, applied to form a steel channel for a steel pipe 200 to go through, after engaging with the driving plate 100 through protrusions 330 in the driving plate head cover that engage with channels 130 in the driving plate 100; the driving plate 100 also comprises a first inner threaded pathway 110, and screw holes 210 are arranged at the according positions in the steel pipe 200, a second inner threaded pathway 310 is arranged at the according position in the driving plate head cover 300. The screw passes through the second inner threaded pathway 310, the screw holes 210 and the first inner threaded pathway 110, before fixing the driving plate head cover 300 and the steel pipe 200 onto the driving plate 100.

Further, the first inner threaded pathway 110 penetrates through the screw hole 210, that is, the steel pipe 200 is restricted by the first inner threaded pathway 110 to avoid sliding left or right horizontally.

Further, at least one second inner threaded pathways 310 are arranged in the driving plate head cover 300, the same number of screw holes 210 as that of the second inner threaded pathways 310 are arranged in the driving plate 100. More specifically, in the embodiment I, at least one screw 400 is applied to fix the steel tube 200 onto the driving plate 100.

In specific implementations, referring to FIG. 1 and FIG. 2, screw pathways 120 are also arranged in the driving plate 100, where screws pass through and connect to a driving unit. When the driving unit starts to move, it drives the driving plate 100 to move by the screw, then the driving plate 100 drives the steel pipe 200 to move together, in such a way, all units to be driven connecting to the pipe 200 will move together. It shows that, the slider for a drive as described in the embodiment I owns a simple machining and assembling process, has a relatively low cost, and is able to meet the user's requirements.

Embodiment II

Figure 4:
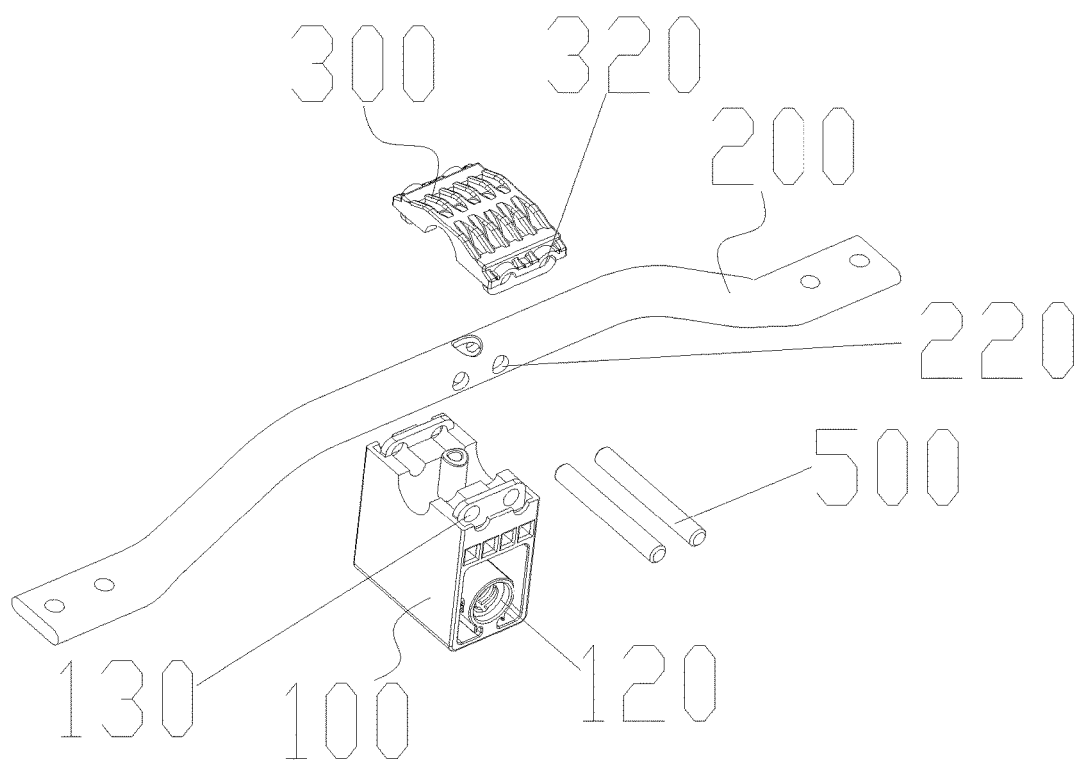
FIG. 4 illustrates an explored diagram of the embodiment II on the slider for a drive as shown in FIG. 3.

As shown in FIG. 3 and FIG. 4 together, the slider for a drive further includes a driving plate head cover 300, applied to form a steel channel for a steel pipe 200 to go through, after engaging with the driving plate 100; the driving plate head cover 300 comprises first fixed pin pathways 320, and second fixed pin pathways 130 are arranged at the according positions in the driving plate 100, third fixed pin pathways 220 are arranged in the according position in the steel pipe 200; Fixed pins 500 pass through the first fixed pin pathways 320, the second pin pathways 130 and the third fixed pin pathways 220, fixing the driving plate head cover 300 and the steel pipe 200 onto the driving plate 100.

Further, a restricting column is arranged on the driving plate 200, and a pathway for the restricting column is arranged at the according position in the steel pipe 200, the restricting column penetrates the restricting column pathway, that is, the steel pipe 200 is restricted by the restricting column, to avoid sliding left or right horizontally.

Further, at least one first fixed pin pathway 320 is arranged in the driving plate head cover 300, the same number of second fixed pin pathways 130 as that of the first fixed pin pathways 320 are arranged in the driving plate 100, and the same number of third fixed pin pathways 220 as that of the first fixed pin pathways 320 are arranged in the steel pipe 200. More specifically, in the embodiment II, at least one fixed pin 500 is applied to fix the steel tube 200 onto the driving plate 100.

In specific implementations, referring to FIG. 3 and FIG. 4, screw pathways 120 are also arranged in the driving plate 100, where screws pass through and connect to a driving unit. When the driving unit starts to move, it drives the driving plate 100 to move through the screw, while the driving plate 100 drives the steel pipe 200 to move together, in such a way, all units to be driven connecting to the pipe 200 will move together. It shows that, the slider for a drive as described in the embodiment II owns a simple machining and assembling process, has a relatively low cost, and is able to meet the user's requirements.

Embodiment III

Figure 6:
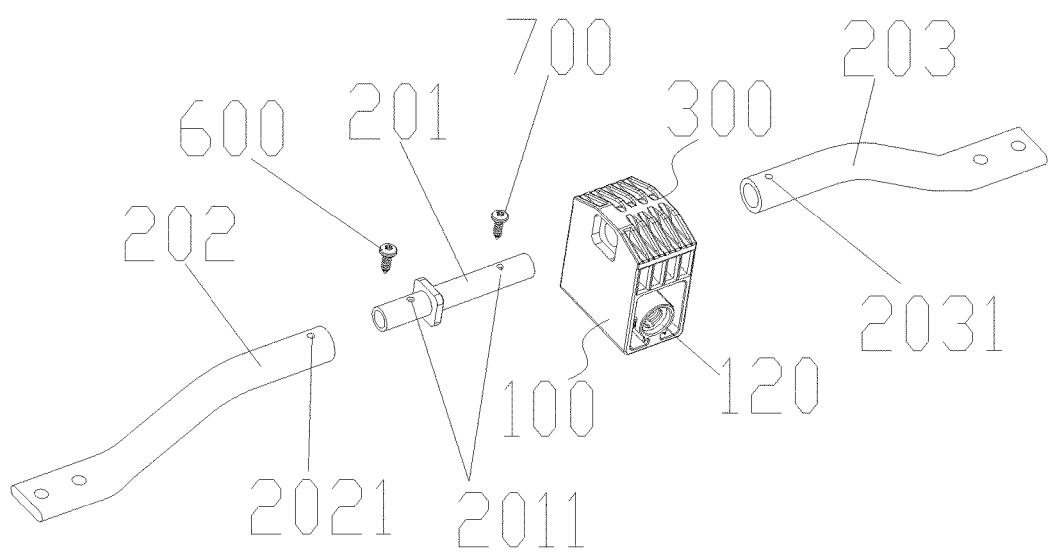
FIG. 6 illustrates an explored diagram of the embodiment III on the slider for a drive as shown in FIG. 5.

As shown in FIG. 5 and FIG. 6 together, the slider for a drive further includes a driving plate head cover 300, applied to form a steel channel for a steel pipe 200 to go through, after engaging with the driving plate 100; the steel pipe 200 comprises an intermediate pipe 201, a first split tube 202 fixedly arranging at one end of the intermediate tube 201 and a second split tube 203 fixedly arranging at the other end of the intermediate tube 201; both the driving plate 100 and the driving plate head cover 300 are fixed on the intermediate tube 201.

Further, third inner threaded pathways 2011 are arranged at both ends of the intermediate tube 201, and a fourth inner threaded pathway 2021 is arranged at the according position in the first split tube, a fifth inner threaded pathway 2031 is arranged at the according position in the second split tube; while a first fixing screw 600 penetrates the fourth inner threaded pathway 2021 and the third inner threaded pathway 2011 in sequence, before fixing the first split tube 202 into the intermediate tube 201; and a second fixing screw 700 penetrates the fifth inner threaded pathway 2031 and the third inner threaded pathway 2011 in sequence, before fixing the second split tube 203 into the intermediate tube 201.

In specific implementations, the connection between the first split tube 202 or the second split tube 203 and the intermediate tube 201 is not limited to the fixing method with screws, it can also be fixed by other methods including fixing axles, as long as it can fix the first split tube 202 and the second split tube 203 solidly to the intermediate tube 201.

In specific implementations, referring to FIG. 5 and FIG. 6, screw pathways 120 are also arranged in the driving plate 100, where screws pass through and connect to a driving unit. When the driving unit starts to move, it drives the driving plate 100 to move through the screws, and the driving plate 100 drives the steel pipe 200 to move together, in such a way, all units to be driven connecting to the pipe 200 will move together. It shows that, the slider for a drive as described in the embodiment III owns a simple machining and assembling process, has a relatively low cost, and is able to meet the user's requirements.

All together, the slider for a drive as provided in the present invention, comprises a driving plate applied to cover the driving unit and move under the driving forces from the driving unit, the driving plate also has a steel pipe fixed there, applied to move the units to be driven together. the slider for a drive as provided in the present invention owns a simple machining and assembling process, has a relatively low cost, and is able to meet the user's requirements.

It should be understood that, the application of the present invention is not limited to the examples listed. It will be possible for a person skilled in the art to make modification or replacements according to the descriptions, which shall all fall within the scope of protection in the appended claims of the present invention.

What is claimed is:

1. A slider comprising:
a driving plate configured with a plurality of sliding channels,
a driving plate head cover having a plurality of protrusions that connects to the sliding channels with the protrusions which are configured to slide into the sliding channels and that covers the driving plate when slid into the sliding channels, and
one or more screws configured to allow a connection of the driving plate and the driving plate head cover;
wherein the driving plate and the driving plate head cover, when slid together by way of the protrusions that slide into the corresponding sliding channels, are configured to together provide a pipe channel situated between the sliding channels of the driving plate, and between the corresponding protrusions of the driving plate head cover, and surrounding the circumference of a pipe;
wherein the one or more screws, the driving plate, the driving plate head cover, and the pipe channel are further configured to allow a steel pipe having one or more holes that allow the one or more screws to pass through to be placed in the pipe channel and to be secured by the screws upon tightening of the one or more screws;
wherein the driving plate has one or more first inner threaded pathways for the one or more screws configured to allow the connection;
wherein the driving plate head cover has one or more second threaded inner pathways for the one or more screws configured to allow the connection; and
wherein the steel pipe is a bow-shaped pipe having two squashed ends, and each squashed end of the steel pipe has two end holes.

2. The slider according to claim 1,
wherein the one or more holes of the pipe, the one or more second inner threaded pathways of the driving plate head cover, and the one or more first inner threaded pathways of the driving plate each have a quantity;
wherein the quantity of the one or more holes of the pipe is the same as that of the one or more second inner threaded pathways of the driving plate head cover; and
wherein the quantity of the one or more first inner threaded pathways of the driving plate is the same as that of the one or more second inner threaded pathways of the driving plate head cover.

3. The slider according to claim 1, wherein the drive plate has one or more screw pathways configured to connect to a drive unit, and wherein the one or more screw pathways are on an axis that is oriented perpendicular to the one or more first inner threaded pathways and the one or more second threaded inner pathways.

4. The slider according to claim 1, wherein the driving plate is configured with two sliding channels, and the driving plate head cover is correspondingly configured with two protrusions, and the driving plate and the driving plate head cover are configured to together provide the pipe channel situated between the two sliding channels of the driving plate, and thus between the two corresponding protrusions of the driving plate head cover.

* * * * *